Feb. 19, 1952     W. H. T. HOLDEN     2,586,540
TORSION METER Filed Feb. 26, 1948     3 Sheets-Sheet 1

INVENTOR
WILLIAM H. T. HOLDEN
BY
ATTORNEY

Feb. 19, 1952

W. H. T. HOLDEN

2,586,540

TORSION METER

Filed Feb. 26, 1948

INVENTOR
WILLIAM H.T. HOLDEN
BY
*G. H. Heydt*
ATTORNEY

Feb. 19, 1952   W. H. T. HOLDEN   2,586,540
TORSION METER

Filed Feb. 26, 1948   3 Sheets-Sheet 3

INVENTOR
WILLIAM H. T. HOLDEN
BY
*G. H. Heydt*
ATTORNEY

Patented Feb. 19, 1952

2,586,540

UNITED STATES PATENT OFFICE 2,586,540

TORSION METER

William H. T. Holden, Woodside, N. Y., assignor to Bell Telephone Laboratories, Incorporated, New York, N. Y., a corporation of New York Application February 26, 1948, Serial No. 11,209

2 Claims. (Cl. 73—136)

This invention relates to apparatus and a method for measuring the torque or the power transmitted by a rotating shaft.

An object of the invention is to provide an accurate and inexpensive apparatus and method for measuring the torque of a rotating shaft. An advantageous feature of the invention is that it may satisfactorily be used in connection with a shaft rotating at almost any speed.

Another object of the present invention is to provide apparatus and a method for producing a measurement dependent upon the torsional deflection between longitudinally spaced portions of a rotating shaft. For example, the present invention is applicable for producing measurements of power transmitted by such a shaft. In one embodiment, the invention provides a method and means for determining both the torque and the speed of the shaft, and for combining these quantities to produce an indication of power.

The above-mentioned, as well as other objects, together with the many advantages obtainable by the practice of the present invention, will be readily comprehended by persons skilled in the art by reference to the following detailed description taken in connection with the annexed drawings which respectively describe and illustrate preferred embodiments of the invention; and wherein:

Figs. 1, 2 and 3 represent three different embodiments of apparatus for measuring the torque transmitted by a rotating shaft, featuring the use of light beams and phototubes responsive to same. Fig. 1 is a schematic plan view.

In illustrative embodiments of the present invention there is provided a first movable element driven in a closed path through a field of energy by a first portion of the shaft, a second element driven in a closed path through a field of energy by a second portion of the shaft displaced longitudinally of said shaft from said first portion, the respective motions of said movable elements having a timed relationship or phase difference determined by the torsional deflection of said shaft between said portions, comparison means responsive to said phase difference adapted to produce an electrical voltage determined thereby, and measuring means controlled by said comparison means.

The aforementioned movable elements may be considered to comprise modulating means operating at a common frequency and adapted to produce modulation effects having a relative phase difference determined by said torsional deflection.

Figure 1:
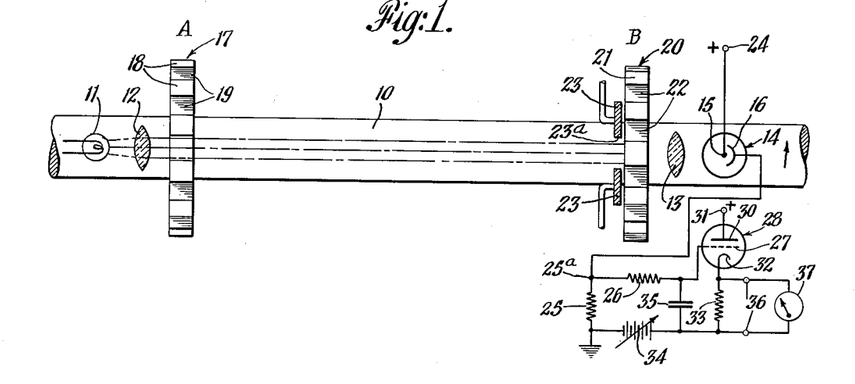

Embodiment shown in Fig. 1

Reference is made to Fig. 1. In this figure there is illustrated apparatus for measuring the torque of a rotating shaft in terms of its torsional deflection, comprising means for directing a beam of light parallel to the shaft, a phototube positioned in the path of said beam, rotary slotted disc-like means, such as two gear-like rotors, carried by the shaft, arranged so that in the absence of torsional deflection of the shaft, the teeth of one gear are aligned with the slots between the teeth of the other gear, and so that their combined effect is to darken the phototube when there is no torsional deflection. When there is torsional deflection in the shaft, a portion of the respective slots of one gear coincides with a portion of the slots of the other gear, and the result is that the light beam is intermittently allowed to strike the phototube, for intervals the duration of which is determined by the torsional deflection of the shaft. The phototube is connected to electrical circuit means including an instrument adapted to produce an indication determined by the duration of the intervals during which the phototube is illuminated. This instrument may be calibrated to read torque directly.

The embodiment of Fig. 1 may now be described in more detail. There is shown a rotating shaft 10. It may be assumed that it is desired to measure the torque transmitted by this shaft. There is provided a light source such as a lamp 11 and optical means including a collimating lens 12 adapted to direct light from said source in a narrow beam parallel to said shaft through a lens 13 toward a light-sensitive device such as a phototube 14 having electrodes including an anode 15 and a cathode 16. It will be understood that the lamp 11, the lens 12, the lens 13 and the phototube 14 are stationary, and do not move when the shaft rotates.

The lamp 11 may be considered to be on continuously during operation of the apparatus. Light from this lamp illuminates the phototube 14, in the absence of any means in the path of the light beam for interrupting same. There is provided means in the path of the light beam for modulating or intermittently interrupting the beam, including movable elements respectively driven by longitudinally separated portions of the shaft. More particularly, as a portion of such means, there is in the present embodiment provided a gear 17 of metal or other opaque material, carried by the shaft at a station A. The gear 17 is shaped to have teeth 18 adapted to pass through the light beam, for interrupting or modulating same, and slots or openings 19 between said teeth, adapted to allow the light beam to pass through the gear.

In the embodiment shown in Fig. 1 it may conveniently be assumed that when a gear tooth 19 is directly in the path of the beam, no light may pass to the right of the gear 17. It may likewise be assumed that when a slot 19 is directly in the line of the beam, the light passes through the gear 17 unimpeded. The invention is not, however, limited to this particular embodiment. Instead of the gear 17 acting alternately to interpose perfectly-opaque teeth 18 and perfectly-light-transmitting slots 19, the gear 17 might comprise alternate portions which are only relatively opaque and relatively light transmitting, respectively.

Carried by the shaft 10 at a station B displaced longitudinally from the station A is a gear 20 similar to the gear 17, having teeth 21 and slots 22. Supported by a frame is a stationary shield 23, having a slot 23a therein, adjacent the gear 20, adapted to limit the light beam to the desired width, that is, to approximately the width of a gear slot, thereby preventing any tendency for the light to pass through slots of the gear 20 except when they are in the proper position. Means not shown are provided for initially adjusting the alignment of the gear 20 relative to the gear 17 so that in the absence of torsional deflection of the shaft 10, the slots of the gear 17 are aligned with the teeth of the gear 20, and the teeth of the gear 17 are aligned with the slots of the gear 20. After the gears are thus aligned, they are firmly affixed to the shaft, so that any torsional deflection of the shaft between the stations A and B will produce a relative angular movement between the gears 17 and 20. It may be seen that if the shaft is rotating with virtually no torsional deflection, no light will reach the phototube 14 since the combined effect of the gears 17 and 20 is to block off all light from the phototube. If, however, there is appreciable torsional deflection of the shaft between stations A and B, then portions of slots 19 of the gear 17 will become aligned with portions of slots 22 of the gear 20, thereby allowing light to reach the phototube when the shaft is in certain angular positions. Moreover, as the torsional deflection increases, the extent to which slots of the respective gears coincide is increased, thereby increasing the duration of the intervals during which the phototube is illuminated.

The shape of an individual gear tooth may be such that the sides of the tooth are parallel to a diameter of the gear passing through the center of the tooth. The result of this arrangement is that the area of the opening provided by the combined effect of the gears is approximately linear with torsional deflection.

The anode 15 of the phototube 14 is connected to a source of positive potential at a terminal 24 and the cathode 16 is connected to a terminal 25a of a load resistor 25, the other terminal of this resistor being connected to ground. As a result of the previously described intermittent illumination of the phototube, current pulses are caused to flow through the phototube and the resistor 25, thereby producing voltage pulses at the terminal 25a, the pulse length being determined by the torsional deflection of the shaft. The terminal 25a is connected through a resistor 26 to the grid 27 of a cathode follower including a vacuum tube 28. The anode 30 is connected to a source of positive potential at a terminal 31. The cathode 32 is connected through a resistor 33 and an adjustable source 34 of bias potential to ground, the source 34 being arranged to maintain the cathode 32 at a positive potential with respect to the grid 27. In one embodiment, the bias source 34 is arranged to maintain the cathode 32 at a potential sufficiently positive with respect to the grid 27 to bias the tube 28 just to cut-off. The grid 27 is connected through a capacitor 35 to the junction between the resistor 33 and the potential source 34. The resistor 26 and the capacitor 35 may be considered to comprise a low-pass filter. Circuit constants are so chosen that this filter removes or shunts to ground alternating components of a frequency corresponding to the frequency with which gear teeth pass through the light beam, and higher components. Thus upon the appearance of positive voltage pulses at the terminal 25a, the upper plate of the capacitor 35 will become charged positively through the resistor 26. Upon the termination of a pulse at the point 25a, as when the phototube 14 is momentarily cut off because of being darkened, the capacitor 35 will begin to discharge slowly through the resistors 26 and 25. It may be seen that if at the point 25a there appears a series of voltage pulses of constant amplitude, then there will appear at the grid 27 of the cathode follower a potential proportional to or determined by the duration of these pulses and hence by the torsional deflection of the shaft. In other words, the capacitor 35 may be considered to perform, with its associated resistors, an integrating function so as to provide at the grid 27 a potential determined by the time integral over a cycle of the periodic voltage appearing at the point 25a. A similar voltage drop will appear across the cathode resistor 33 of the cathode follower.

The ends of the resistor 33 are connected to output terminals 36 for the system. As shown in Fig. 1, an indicator such as a direct current voltmeter 37 may be connected to the terminals 36 for indicating the voltage appearing across the resistor 33. This voltmeter may be calibrated to read torque directly.

Instead of employing the source 34 to bias the cathode follower to cut-off, this source may be omitted, and the calibration of the voltmeter or its zero-set may be arranged to take into account the voltage drop which will appear across the resistor 33 for zero torsional deflection.

In certain other uses for the invention, the terminals 36 may be connected to other apparatus in order to derive a measurement dependent upon torque, such as a measurement of the power transmitted by the shaft. In such an embodiment there would be provided means such as a generator for deriving a voltage proportional to the speed of the shaft, and this voltage, together with the voltage from the terminals 36 would be applied to a multiplying device in order to derive an indication of power. Such a multiplying device will be described at a subsequent point.

It may be seen that there is provided a first movable element, such as for example a tooth of the gear 17, driven in a closed path through a field of light energy by a first portion of the shaft, a second movable element, such as a tooth 21 of the gear 20 driven in a closed path through a field of light energy by a second portion of the shaft displaced longitudinally from the first portion, the respective motions of these movable elements having a phase difference determined by the torsional deflection of the shaft between these portions, and there is further provided comparison means including the phototube 14 responsive to this phase difference adapted to produce an electrical voltage determined thereby, and measuring means, such as the voltmeter 37, controlled by said comparison means.

Figure 2:
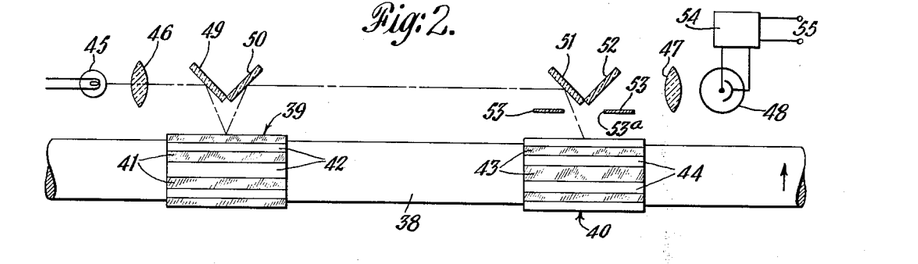
Figs. 2 and 3 are schematic elevational views, certain portions being shown in section.

*Embodiment shown in Fig. 2*

Reference is made to Fig. 2 which represents a different embodiment of the present invention. There is shown a rotary shaft 38 and means for measuring the torsional deflection of this shaft. The apparatus of Fig. 2 employs a phototube, a source of a beam of light, and optical means adapted to direct this beam along a path including various reflecting means, toward the phototube. The shaft is provided with longitudinally separated portions, each comprising a series of light-absorbing and light-reflecting surfaces, arranged circumferentially with respect to the axis of the shaft. Each of these portions is adapted to pass into the path of the light beam, and to absorb the light or transmit same by reflection, depending upon the angular position of the shaft. The combined effect of these longitudinally spaced portions is to darken the phototube if there is no torsional deflection of the shaft. If there is torsional deflection, the combined effect is to illuminate the phototube intermittently during intervals the duration of which is proportional to the torsional deflection. The phototube may be connected to electrical circuit means and indicating means of the type described in connection with Fig. 1.

Fig. 2 may now be described in more detail. In this embodiment, the shaft 38 is provided with rotary light interrupting or modulating means, which may comprise sleeve-like members 39 and 40, adjustably fixed to the shaft, or which may comprise portions of the shaft itself provided with surface regions of a type to be described. The member 39 is provided with a plurality of light-reflecting surfaces or facets 41 and a plurality of dark or light-absorbing surfaces 42, alternately spaced in a circumferential arrangement with respect to the axis of the shaft. The member 40 is also provided with a plurality of light-reflecting surfaces 43 and a plurality of light-absorbing surfaces 44, in an arrangement generally similar to that of the member 39, but having an alignment to be described. The light reflecting surfaces and the light-absorbing surfaces may all in the present illustration be assumed to be flat and may be considered to be of equal breadth so that they intercept equal angles at the axis of the shaft. The angular position of the member 40 on the shaft is initially adjusted so that when there is no torsional deflection in the shaft the angular positions of the light-absorbing surfaces 44 of the member 40 correspond to the angular positions of the light-reflecting surfaces 41 of the member 39, and the angular positions of the light-reflecting surfaces 43 of the member 40 correspond to the angular positions of the light-absorbing surfaces 42 of the member 39.

As a particularly useful variation, instead of employing longitudinally spaced sleeve-like members 39 and 40, having light-absorbing and light-reflecting surfaces, longitudinally spaced portions of the shaft itself may be painted to have alternate black or light-absorbing and white or light-reflecting areas, arranged in the same general manner as the previously described light-absorbing and light-reflecting surfaces of the members 39 and 40. In such an embodiment it may be assumed that the light-reflecting and light-absorbing surfaces are cylindrical, comprising the surfaces of the shaft itself.

There is provided a lamp 45, collimating lens means 46 and 47, and a phototube 48. Cooperating with the rotary member 39 is a mirror 49, in the path of and at an oblique angle to the light from the lamp 45 and the lens 46. The mirror 49 is adapted to reflect the light beam toward the member 39. There is provided a mirror 50, similarly obliquely oriented to the axis of the beam from the lamp, and adapted to receive light reflected by the light-reflecting surfaces 41, when they are opposite the mirrors 49 and 50. The light beam is directed by the mirror 50 in a beam parallel to the shaft, and there is provided a pair of mirrors 51 and 52, positioned adjacent to and cooperating with the rotary member 40 in a manner generally similar to the previously described cooperation of the mirrors 49 and 50 with the member 39. There is provided a shield 53 having a slot 53a therein adapted to provide an aperture such that when an area of the member 40 is illuminated, the end boundaries of the illuminated area will be straight, that is, will lie in planes perpendicular to the axis of the shaft. The purpose of this arrangement is to improve the linearity of the operation of the apparatus.

In the absence of torsional deflection of the shaft 38, then when the shaft is in such an angular position that the light beam is reflected by one of the light-reflecting surfaces 41, the beam will be absorbed by one of the light-absorbing surfaces 44. When the shaft has rotated through a small angle such that one of the light-reflecting surfaces 43 is in position to reflect the beam, the beam will be intercepted by one of the light-absorbing surfaces 42. Consequently, when there is no torsional deflection, the phototube 48 is dark, at all angular positions of the shaft.

If, however, there is torsional deflection in the shaft, the alignment between the members 39 and 40 will be changed somewhat. It is contemplated that the angular deflection of the shaft between the members 39 and 40 will be a small fraction of the angle intercepted at the axis of the shaft by one of the facets of the members 39 or 40. When such a deflection occurs, there is some effective overlapping of the light-reflecting surfaces 41 and 43, and the combined effect is to illuminate the phototube intermittently for intervals having a duration proportional to the deflection of the shaft.

The phototube 48 is connected to electrical circuit means 54 which may for example be of the type described in connection with Fig. 1, adapted to produce at a pair of output terminals 55 a voltage proportional to or determined by the duration of the intervals of illumination of the phototube, and hence determined by the torsional deflection of the shaft. The terminals 55 may be connected to a voltmeter adapted to read torque directly.

A variety of surfaces may be employed to perform the light-absorbing function of the surfaces 42 and 44 and the light-reflecting function of the surfaces 41 and 43. Thus the surfaces 41 and 43 may be mirror-like, comprising mirrors or polished metal, or may be white or light colored. The surfaces 42 and 44 may be painted a dull black or other dark color. As a variation, the surfaces 42 may be adapted to polarize the light beam in one direction and the surfaces 44 may comprise polarizing surfaces oriented in a direction so that polarized light from the surfaces 42 will not be reflected by the surfaces 44.

Figure 3:
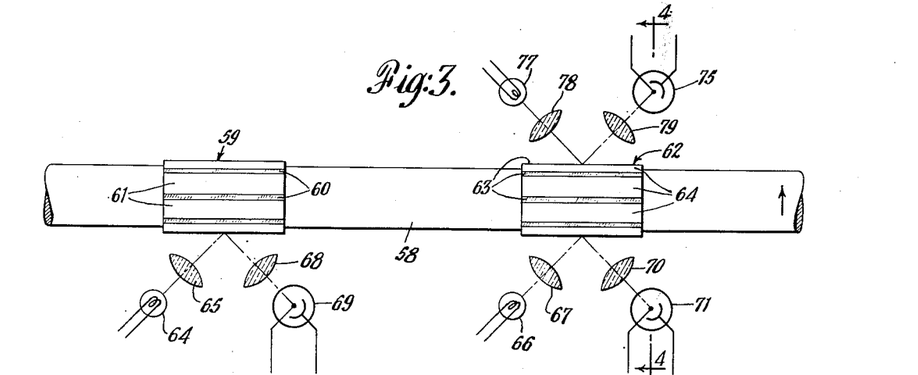
Figure 4:
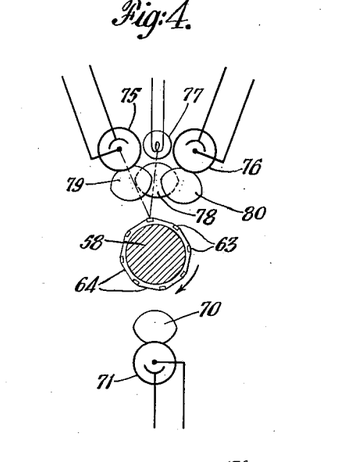
Fig. 4 is a cross-sectional view of a portion of the apparatus shown in Fig. 3, looking in a direction parallel to the shaft, the sectional plane being indicated in Fig. 3, at the line 4—4.
Figure 5:
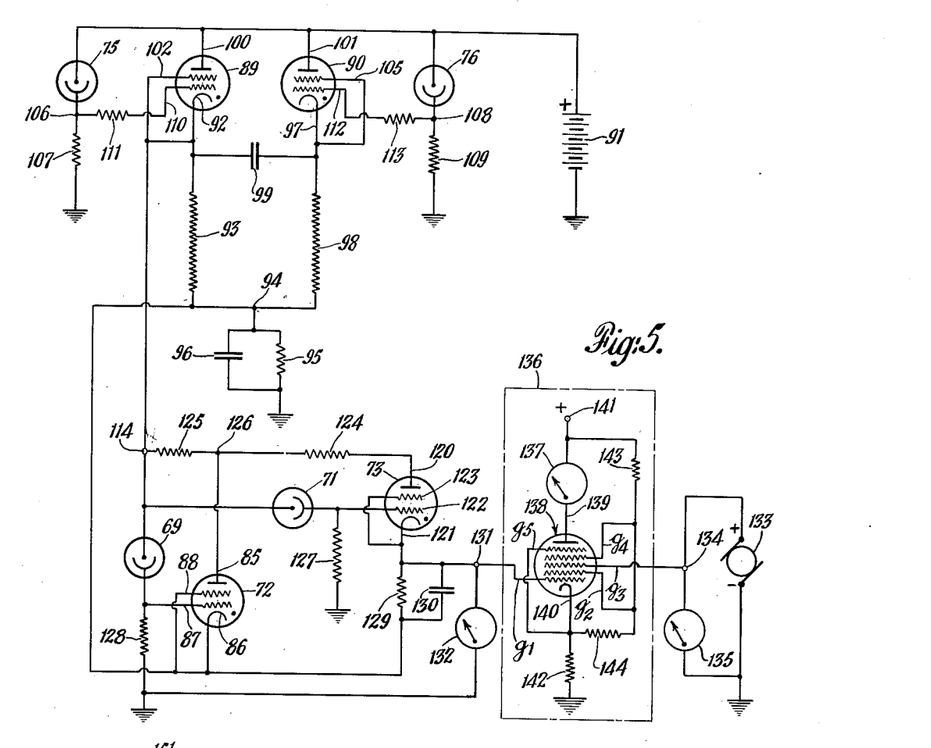
Fig. 5 is a circuit diagram showing an electrical circuit in which the phototubes of Figs. 3 and 4 are connected, for deriving a voltage determined by the torque of the shaft, a generator for producing a voltage determined by the speed of the shaft, and means for combining these voltages in order to obtain a response determined by the power transmitted by the shaft.

Embodiment shown in Figs. 3, 4 and 5

Reference is made to Fig. 3, which, together with Figs. 4 and 5, represents a still different embodiment of the present invention. There is shown a rotary shaft 58, and it may be assumed that it is desired to measure the power transmitted by the shaft, as well as the torque and speed of the shaft. There is provided a rotary member 59 having light-reflecting surfaces 60 and light-absorbing surfaces 61. The light-reflecting surfaces may conveniently be narrower than the light-absorbing surfaces. Also carried by the shaft 58 and spaced longitudinally from the member 59 is a similar member 62 having light-reflecting surfaces 63 and light-absorbing surfaces 64. The members 59 and 62 are supplied with separate beams of light. This light may come from a common source, or may, as in the illustrated embodiment, come from two different sources, such as a lamp 64 and lens 65, for the member 59, and a lamp 66 and lens 67, for the member 62. There is provided a lens 68 and a phototube 69, positioned to receive light reflected by the surfaces 60, when the shaft is in certain angular positions. When the shaft is in angular positions such that the light beam from the lamp 64 and the lens 65 strikes a light-absorbing surface 61, virtually no light reaches the phototube 69.

There is also provided a lens 70 and a phototube 71 adapted to receive light reflected by the light-reflecting surfaces 63, when the shaft is in certain angular positions, and adapted to receive virtually no light when the beam from the lamp 66 strikes light-absorbing surfaces 64.

The members 59 and 62 are so oriented with relation to one another that when there is no torsional deflection, phototubes 69 and 71 are simultaneously illuminated, and simultaneously darkened. In other words, assuming that the aforementioned phototubes 69 and 71, and their associated light sources and lenses, are at the same angular positions, the members 59 and 62 are initially so aligned that when there is no torsional deflection the light-reflecting surfaces 60 lie in the same planes as the light-reflecting surfaces 63 and the light-absorbing surfaces 61 lie in the same planes as the light-absorbing surfaces 64.

As the shaft rotates, if there were no torsional deflection, the phototubes 69 and 71 would be illuminated for a brief interval and then darkened for a somewhat longer interval, in synchronism. On the other hand, if there is torsional deflection in the shaft, the phototube 69 will be alternately illuminated and darkened, and the phototube 71 will be alternately illuminated and darkened, but these actions will not be in synchronism. There will be a time lag or phase difference, between the moment when one tube is first illuminated and the moment when the other tube is first illuminated. The amount of this phase difference will be determined by the angular deflection of the shaft between the longitudinally spaced members 59 and 62.

It may be assumed that there is a torsional deflection of the shaft in such a direction that the phototube 71 is illuminated slightly before the phototube 69 is illuminated. More particularly, it may be assumed that the direction of rotation, as seen in Fig. 4, is clockwise, and that the shaft is driven by a driving means located to the right of that portion of the shaft which is shown in Fig. 3. If there were no load, and hence no torsional deflection, the phototubes 69 and 71 would be illuminated and darkened simultaneously. It may be assumed, however, that there is a load to the left of the shaft of Fig. 3, and that, as stated, the phototube 71 is illuminated shortly before the phototube 69. There is provided a comparison circuit, illustrated in Fig. 5, adapted to be sensitive to the phase difference or time relationship between the illumination of the phototubes 69 and 71. As will be described, this circuit includes a pair of gaseous discharge tubes or thyratrons 72 and 73, respectively fired by the phototubes 69 and 71. For extinguishing these tubes means are provided for interrupting their anode current supply at desired intervals. As a portion of such means there is provided a pair of phototubes 75 and 76, positioned generally in a plane perpendicular to the axis of the shaft 58, but located at different angular positions with respect to said axis, as shown in Fig. 4. A lamp 77 is located in a plane passing through the axis of the shaft 58, said plane approximately bisecting the angle subtended at said axis by the phototubes 75 and 76, as shown in Fig. 4. As shown in Fig. 3, the lamp 77 also lies in a plane perpendicular to the axis of the shaft 58 to the left of the phototubes 75 and 76. More particularly, the position of the lamp 77 is such that a light beam from this lamp may be reflected by a light-reflecting surface 63 toward either of the phototubes 75 or 76, depending upon the angular position of the shaft. The optical path from the lamp 77 to the phototubes 75 and 76 is provided with collimating lenses 78, 79 and 80, as shown in Figs. 3 and 4.

As shown in Fig. 5, the thyratron 72 has an anode 85, a cathode 86, a control grid 87 and a shield grid 88. The grid 87 is controlled by the phototube 69, in a manner to be described, and the plate potential supplied to the anode 85 is controlled by the phototubes 75 and 76, in a manner which will now be described.

There is provided a thyratron 89 the firing of which is controlled by the phototube 75 and a thyratron 90, the firing of which is controlled by the phototube 76. The firing of the thyratron 90 serves to extinguish conduction of the thyratron 89, in a manner to be described.

The general function of the various phototubes and their associated thyratrons may now be stated in a typical order of operation as the shaft rotates under a condition of torsional deflection, and subsequently a detailed explanation of the circuit will be given. It may initially be assumed that no phototubes are illuminated and that the thyratron 90 is conducting, all the other thyratrons being off.

First, the phototube 75 is illuminated for a short interval, firing the thyratron 89, and thereby suppling a potential to the anodes of the thyratrons 72 and 73 sufficient to support conduction. They do not, however, fire because their cathodes are held at a potential sufficiently higher than their control grids to prevent firing.

Second, the phototube 71 is illuminated for a short interval, firing the thyratron 73.

Third, the phototube 69 is illuminated for a short interval, firing the thyratron 72 and causing conduction in the thyratron 73 to be extinguished.

Fourth, the phototube 76 is illuminated for a short interval, firing the thyratron 90, extinguishing conduction in the thyratron 89, and causing the anode supply potential to the thyratrons 72 and 73 to drop below that sufficient to support conduction. Hence the thyratron 72 is extinguished.

The thyratrons are now in the condition originally assumed. It may be noted that since the grids lose control of the thyratrons after firing, the various phototubes, which control the grids, are effective in changing the condition of the circuit when the phototubes are first illuminated, and the next step in the cycle is caused not by darkening of any phototube, but by the illumination of another one.

The circuit may now be described in more detail. There is provided a source of B-supply potential such as a battery 91, having its negative terminal grounded and its positive terminal connected to the anodes of the phototubes 75 and 76 and the thyratrons 89 and 90. The cathode 92 of the thyratron 89 is connected through a resistor 93 to a point 94, and this point is connected to ground through a resistor 95 and a parallel capacitor 96. As will appear from the subsequent description, the point 94 is normally at a positive potential with respect to ground.

The cathode 97 of the thyratron 90 is connected through a resistor 98 to the point 94, and is connected through a capacitor 99 to the cathode 92 of the thyratron 89. The thyratrons 89 and 90 are provided with anodes 100 and 101; and with shield grids 102 and 105, respectively, connected to their cathodes.

The anode of the phototube 75 is as stated connected to the positive terminal of the battery 91, and the cathode is connected at a point 106 to one terminal of a resistor 107, the other terminal of which is grounded. Similarly the cathode of the phototube 76 is connected at a point 108 to one terminal of a resistor 109, the other terminal of which is grounded. The grid 110 of the thyratron 89 is connected through a resistor 111 to the point 106, and the grid 112 of the thyratron 90 is connected through a resistor 113 to the point 108.

The cathode 92 of the thyratron 89 is connected to a point 114, which may be considered a terminal for the current supply to the plate circuits of the thyratrons 72 and 73 and the phototubes 69 and 71. At the terminal 114, because of the action of the phototubes 75 and 76 and the thyratrons 89 and 90, there is available during one portion of the cycle a high positive potential, greater than sufficient to support conduction in the thyratrons 72 and 73, and during another portion of the cycle only a very low positive potential, namely that appearing at the point 94, insufficient to support conduction in the thyratrons 72 and 73.

The operation of thyratrons 89 and 90 will now be described. The characteristic of the various phototubes is that in the absence of illumination, there is negligible electron emission from their cathodes, and hence under this condition the tubes may be considered to present a high resistance at their terminals. When illuminated, there is appreciable electron emission from the cathode, and conduction may take place through the tube to an extent related to the illumination. Hence the various phototubes may be considered to present at their terminals a low resistance when receiving considerable illumination and a high resistance when receiving little illumination. In Fig. 5, before the phototube 75 is illuminated, it represents virtually an open circuit, and hence the point 106 and the grid 110 are substantially at ground potential. An initial condition may be assumed in which the thyratron 90 is conducting, having previously extinguished the thyratron 89. The plate current through the thyratron 90 flowing through the resistor 95 to ground will elevate the potential at the point 94, and hence that at the cathode 92, above ground. As a result, the grid 110 is at a potential sufficiently below that of the cathode 92 so that the tube 89 will not fire.

When the phototube 75 is illuminated, it presents a small resistance at its terminals, and because of the voltage divider action of the tube 75 in series with the resistor 107, the potential at the point 106 is elevated to such an extent that the tube 89 is fired, and the grid 110 thereafter loses control. A large plate current consequently flows through the tube 89 and its cathode resistor 93. This current quickly elevates the potential of the cathode 92, and this rise in potential is applied through the coupling capacitor 99 to the cathode 97 of the tube 90. The capacitor 99 was previously charged because the potential at the cathode 97 was, during conduction of the tube 90, considerably above that at the point 94, while the potential at the cathode 92 was, while the tube 89 was not conducting, the same as that at the point 94. Since the voltage across a capacitor cannot instantaneously change, then it follows that when the thyratron 89 fires, the sudden rise in potential of the left-hand plate of the capacitor 99 causes the right-hand plate thereof to rise by an equal amount, and as a result, the cathode 97 of the thyratron 90 is elevated to a potential higher than the potential of the anode 101, thus extinguishing conduction of this thyratron.

When at a subsequent moment the phototube 75 is no longer illuminated and the phototube 76 is illuminated, the thyratron 90 will be caused to fire, extinguishing conduction in a similar manner in the thyratron 89.

It will therefore be understood that as the thyratron 89 is alternately turned on and off, the potential at its cathode, and hence at the terminal 114, will rise and fall. The usefulness of such a voltage will be understood following further description of the thyratrons 72 and 73.

The thyratron 73 is provided with an anode 120, a cathode 121, a control grid 122, and a shield grid 123. The shield grid is connected to the cathode. The anode 120 is connected through a resistor 124 and a resistor 125 to the terminal 114. The junction between the resistors 124 and 125 may be indicated by the reference numeral 126. The grid 122 is connected through a grid resistor 127 to ground and is connected to the cathode of the phototube 71. The anode of the phototube 71, as well as the anode of the phototube 69, is connected to the terminal 114. The cathode of the phototube 69 is connected to the grid 87 of the phototube 72 and through a resistor 128 to ground.

The cathode 86 of the thyratron 72 is connected to the point 94, and the cathode 121 of the thyratron 73 is connected through a resistor 129 to the point 94. A capacitor 130 is connected in parallel with the resistor 129. The junction of the connections to the cathode 121, the resistor 129 and the capacitor 130 may be connected to an output terminal 131. As will be explained, the operation of the device is such that at the terminal 131 there appears a direct current voltage proportional to or determined by the torsional deflection of the shaft. Connected between the terminal 131 and ground is a voltmeter 132, calibrated to read torque directly.

There is provided a direct current generator 133 driven by the shaft, having one terminal grounded and adapted to provide at its upper terminal 134, a positive potential proportional to the speed of rotation of the shaft. A direct current voltmeter 135 may be connected across the generator, calibrated to indicate the speed of the shaft. There is provided a multiplying device 136 responsive to the voltages at the terminals 131 and 134, adapted to produce an electrical response such as a voltage or current, proportional to the product of these voltages. In the illustrated embodiment there is shown a pentagrid converter adapted to perform this function and a direct current ammeter 137 responsive thereto. The pentagrid converter comprises a vacuum tube 138 having an anode 139, a cathode 140 and five grids, which may be designated as $g_1$, $g_2$, $g_3$, $g_4$, and $g_5$, disposed in that order between the cathode and the anode. The anode 139 is supplied with positive potential from a terminal 141, the instrument 137 being connected in series with the anode circuit. The cathode is connected through a resistor 142 to ground. The first control grid, grid $g_1$, is connected to the terminal 131. The grids $g_2$ and $g_4$ are connected together and are maintained at a relatively high positive potential by means of bleeder resistors 143 and 144, connected in series between the terminal 141 and the cathode 140, the grids $g_2$ and $g_4$ being connected to the junction between the resistors 143 and 144. The bleeder resistors 143 and 144 also serve with the cathode resistor 142 to maintain the cathode at a normally positive bias potential. The grid $g_3$, which serves as a second control grid, is connected to the terminal 134. The grid $g_5$ is connected to the cathode 140.

The anode current through the pentagrid converter tube 138 is approximately proportional to the product of the potentials at the terminals 131 and 134, applied to the grids $g_1$ and $g_3$, respectively. Since these potentials are approximately proportional to the torque and speed, respectively, of the shaft, the current through the ammeter 137 is approximately proportional to the power transmitted by the shaft. The ammeter 137 can therefore be calibrated to read power directly.

*Operation of embodiment shown in Figs. 3, 4 and 5*

Let it be assumed that the thyratrons 72, 73, and 89 are in a non-conducting condition and that the thyratron 99 is conducting. As the shaft rotates, let it now be assumed that the phototube 75 is illuminated, firing the thyratron 89 in the manner previously described, and producing at the terminal 114, a potential sufficient to initiate and support conduction in the thyratrons 72 and 73. In the absence of illumination of the phototubes 69 and 71, however, these thyratrons will not fire because their grids are substantially at ground potential while their cathodes are at the potential of the point 94, which is sufficiently above ground potential and hence above the potential of the grids, that the tubes will not fire. Very shortly after the phototube 75 is illuminated and causes appearance of a large positive potential at the terminal 114, the phototube 71 is illuminated because of further rotation of the shaft. Current therefore flows through the resistor 127, causing the grid 122 to assume a positive potential, and thereby firing the thyratron 73. Tortional deflection of the shaft prevents the phototube 69 from being simultaneously illuminated. It is not important whether the phototube 75 is darkened before the phototube 71 is illuminated or not, since the darkening of the phototube 75 does not change the potential at the point 114. Resistors 124 and 125 in the anode circuit of the thyratron 73 are fairly large, for example, of the order of 10,000 ohms each. When only the thyratron 73 is drawing current through the resistor 125, that is, while the thyratron 72 is off, the potential at the plate 120 of the thyratron 73 is sufficient to support conduction in the thyratron 73.

As the shaft rotates still further, the phototube 69 is illuminated, causing a current to flow through the resistor 128, thereby elevating the potential of the grid 87 sufficiently to fire the phototube 72. Now that the thyratron 72 as well as the thyratron 73 is conducting, the current through the resistor 125 is of course greater than when only the thyratron 73 was conducting, and hence the potential at the point 126 is somewhat below its previous value. The potential at this point is sufficient, however, to support conduction in the thyratron 72. The potential at the plate 120 of the thyratron 73, being lower than that at the point 126 by the amount of the voltage drop through the resistor 124, now falls below that necessary to sustain conduction in the thyratron 73, and this tube is extinguished. Thus when the phototube 69 is illuminated, it causes the thyratron 72 to "rob" the thyratron 73 of its current.

It may be seen that the duration of the interval of conduction of the thyratron 73 is determined by the lag between the time the phototube 71 is illuminated and the time the phototube 69 is illuminated which in turn is determined by the torsional deflection of the shaft.

As the shaft rotates still further the phototube 76 is illuminated, firing the thyratron 99, thereby extinguishing the thyratron 89 and causing the potential at the point 114 to drop to such an extent that conduction in the thyratron 72 is extinguished. The thyratrons are now in the same condition as that assumed at the start of the cycle.

As indicated, there flows through the thyratron 73 a series of unidirectional current pulses, each having a duration proportional to or determined by the torsional deflection of the shaft. The amplitude of the current pulses is independent of the torsional deflection. The time constant of the resistor 129 and its parallel smoothing capacitor 130 may be assumed to be large compared with the repetition period of the current pulses. Since the resistor 129 and the capacitor 130 are in series with the thyratron 73, there appears across the resistor 129 an approximately steady unidirectional voltage having a value determined by the duration of the pulses and hence by the torque transmitted by the shaft. The lower end of the resistor 129 remains at the steady potential existing at the point 94. For convenience, the voltmeter 132, on which the torque is read, may be connected between the upper end of the resistor 129, that is, the terminal 131 and ground, and the calibration of the voltmeter may be arranged to take into account the fact that the potential of the terminal 131 with respect to ground is slightly greater than the potential across the resistor 129, by the constant value of the potential at the point 94.

As indicated, the torque voltage at the point 131 and the speed voltage at the point 134 are applied to the pentagrid converter 138 which responds by producing an anode current determined by the product of these voltages, and hence determined by the power. The power may therefore be read on the ammeter 137.

Figure 6:
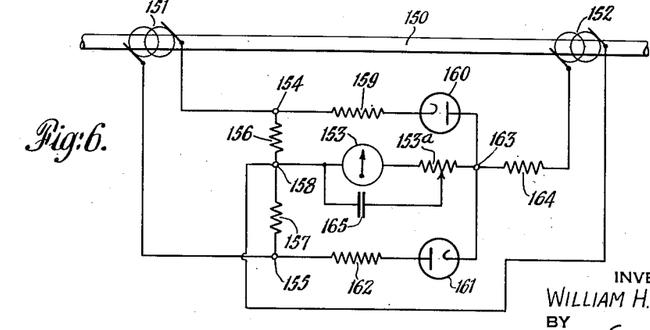
Fig. 6 is a schematic diagram of another embodiment of apparatus for measuring the torque of a rotating shaft, featuring the use of generators driven by longitudinally spaced portions of the shaft and a phase-sensitive circuit connected to said generators.

*Embodiment shown in Fig. 6*

Reference may be made to Fig. 6 which illustrates a different embodiment of the present invention. It may be assumed that it is desired to measure the torque transmitted by the rotating shaft 150 in terms of its torsional deflection. There is provided a first alternating current generator 151 driven by a first portion of the shaft, and a second alternating current generator 152, driven by a second portion of the shaft, displaced longitudinally from the first portion. The rotors of these generators may be geared to the shaft, or may be mounted on the shaft. The rotors of the respective generators are initially so aligned with respect to their stators that in the absence of torsional deflection of the shaft, the alternating voltages generated have a predetermined phase relationship. Thus, for example, they may be initially adjusted to be in quadrature, that is, out of phase by 90 degrees. There is provided phase-sensitive comparison means, connected to the respective generators, adapted to provide a response determined by the phase difference between the voltages from the respective generators. It may be seen that this phase difference will be determined in turn by the torsional deflection of the shaft between the generators.

The phase-sensitive comparison means provided in Fig. 6 comprises a phase detector circuit, and there is provided a direct current voltmeter 153, which may conveniently be a center-scale type of instrument, connected into this phase detector circuit and responsive thereto, calibrated to read the torque transmitted by the shaft.

The generator 151 is connected to a pair of terminals 154 and 155. The terminal 154 is connected to the terminal 155 through two parallel paths. A first of these paths comprises a resistor 156 and a resistor 157, connected in series and having a mutual junction at a terminal 158. A second of these paths comprises a resistor 159, a diode 160, a diode 161 and a resistor 162, in series. The diode 160 is oriented so that its cathode is connected to the resistor 159 and is toward the terminal 154, while its anode is away from the terminal 154. The anode of the diode 161 is connected to the resistor 162 and is toward the terminal 155, while its cathode is away from the terminal 155. The anode of the diode 160 and the cathode of the diode 161 are each connected to a terminal 163.

One terminal of the generator 152 is connected through a large resistor 164 to the terminal 163. The other terminal of the generator 152 is connected to the terminal 158. The voltmeter 153 and an associated series resistor 153a are bridged across the terminals 158 and 163. The illustrated resistor 153a schematically represents the internal resistance of the voltmeter and a supplementary external resistor. Connected between the terminal 158 and a point on the resistor 153a is a capacitor 165.

Typical circuit constants are:

| | | |
|---|---|---|
| Resistor 156 | ohms | 1000 |
| Resistor 157 | do | 1000 |
| Resistor 159 | do | 10,000 |
| Resistor 162 | do | 10,000 |
| Resistor 164 | do | 100,000 |
| Resistor 153a (including internal resistance of voltmeter 153) | ohms | 10,000 |
| Capacitor 165 | microfarads | 4 |

It may be noted that the circuit constants are so proportioned that in so far as the potential applied from the generator 151 alone is concerned, the voltmeter 153 is in the position of an indicating device connected into a balanced bridge. More particularly, in the particular circuit illustrated, the resistor 156 has the same value as the resistor 157, namely, 1000 ohms, the resistor 159 has the same value as the resistor 162, namely, 10,000 ohms, and the diode 160 is similar to the diode 161. Thus in the two aforementioned electrical paths between the terminals 154 and 155, the terminal 158 represents the midpoint of one path, and the terminal 163 represents the midpoint in the other electrical path. In different embodiments it would not be necessary that these points represent midpoints, but it is desirable that the resistor 156 have the same ratio to the resistor 157 as does the resistor 159 to the resistor 162. In one method of analysis of the operation of the circuit shown in Fig. 6, it is convenient to regard the alternating voltage generated by the generator 152 as the main signal to be detected, and to regard the voltage generated by the generator 151 as a reference signal. It is preferable that the reference signal from the generator 151 be several times as large in amplitude as the main signal from the generator 152. Because of the aforementioned balanced relationship existing at the terminals 158 and 163, it may be seen that the reference signal from the generator 151 applied to the terminals 154 and 155, cannot alone cause a deflection of the voltmeter 153.

It may be assumed that the initial adjustment of generators is such that for zero deflection either signal leads the other by 90 degrees. As will be understood from subsequent description, zero deflection of the voltmeter results in either case.

In actual practice the torsional deflection of the shaft will always be small enough so that the resulting shift in phase of the signals from the generators is small. The shift may for example be of the order of 5 degrees or 10 degrees. Thus if the signals are, with no torsional deflection, out of phase by 90 degrees, they may with torsional deflection be out of phase by, for example, 80 degrees. It may be convenient, however, in analyzing the circuit to consider its operation if the torsional deflection of the shaft were such that the signals from the generators approach an "in-phase" condition. In the present discussion the expression "in-phase" may conveniently be employed to describe a condition such that terminal 154 assumes a positive potential with respect to the terminal 155 at the same time as the terminal 163 goes positive with respect to the terminal 158. It may be noted that when the terminal 154 is positive with respect to the terminal 155, the diodes 160 and 161 tend to be rendered non-conducting because of the tendency for their cathodes to be driven to a more positive potential than their anodes. Assuming an in-phase condition and assuming that the signals are in the half-cycle when the terminal 163 is positive with respect to terminal 158, it is observed that there will be in this half-cycle a flow of postive or conventional current from right to left through the voltmeter, and the right-hand plate of the capacitor 165 will become charged positively with respect to the left-hand plate. There will be no current flowing from the terminal 163 to the terminal 158 via the diodes, their cathodes being at a higher potential than their anodes. In the other half-cycle, when the terminal 158 is positive with respect to the terminal 163, the terminal 155 will be positive with respect to the terminal 154, and the diodes will be rendered conducting. As a result, the effective input impedance between the terminals 158 and 163 is considerably lowered; hence the voltage drop through the large resistor 164 is sufficiently great that there is a relatively small voltage applied across the terminals 158 and 163 and hence only a small left-to-right or discharging current is supplied to the capacitor 165 by the generator 152 during this half-cycle. In view of this fact, and the additional fact that the circuit constants are so chosen that the discharge path of the capacitor through the voltmeter has a large time constant relative to the repetition period of the signals from the generator, this capacitor does not discharge appreciably during the half-cycle in question, but serves to maintain across the voltmeter a voltage of such a nature as to cause a deflection similar to that produced during the previous half-cycle.

It may therefore be seen that when the phase relationship between the signals from the generators 151 and 152 approaches an in-phase condition, positive or conventional current flows through the voltmeter 153 from right to left.

It will now be shown that, if the phase relationship between signals from the generators 151 and 152 approaches a 180-degree out-of-phase condition, the deflection of the voltmeter 153 will be in the opposite direction. A 180-degree out-of-phase condition may in the present discussion be understood to mean a phase relationship such that when the terminal 154 is positive with respect to the terminal 155, the terminal 163 is negative with respect to the terminal 158. With such a phase relationship and in the half-cycle when the last-mentioned conditions exist, the diodes will be non-conducting and there will be a flow of current from the terminal 158 through the voltmeter from left to right toward the terminal 163, with a consequent charging of the condenser 165 so that its left-hand plate is positive with respect to its right-hand plate. During the other half-cycle, the diodes will be rendered conducting because of the fact that the terminal 155 is positive with respect to the terminal 154. As a result, there will exist between the terminals 158 and 163 a current path through the diodes as well as through the voltmeter. A larger current consequently flows through the resistor 164 producing such a voltage drop therein that only a small voltage is impressed across the terminals 163 and 158, and the capacitor 165 is not discharged to any great extent but is capable of maintaining a flow of current through the voltmeter from left to right, so as to maintain the deflection in the same direction as during the previous half-cycle. It may therefore be seen that if the signals from the generators 151 and 152 approach a 180-degree out-of-phase condition the deflection of the voltmeter is in a direction opposite to its direction of deflection when the signals are in phase.

Analysis will show that if the signals are in quadrature, that is, 90 degrees out-of-phase, the capacitor 165 will be partially charged first in one direction and then in the other, and there will result a net zero deflection of the voltmeter, particularly in view of the fact that its moving elements have a certain amount of inertia.

In actual operation, the system of Fig. 6 may be, as stated, initially adjusted so that when there is no torsional deflection of the shaft, the signals from the generators 151 and 152 are in quadrature, and there is zero deflection of the voltmeter. When there is torsional deflection of the shaft, the voltmeter will be deflected to an extent dependent upon the amount of torsional deflection of the shaft, and approximately linearly therewith for small angles of torsional deflection. The voltmeter 153 may therefore be calibrated to read torque directly. It will be noted that the direction of deflection of the voltmeter will indicate the direction of the torsional deflection.

It may be assumed that the alternating current generators 151 and 152 include means not shown in detail for producing magnetic fields, and movable windings adapted to interrupt or cut through said fields for generating alternating voltages or for producing modulation effects. Hence in Fig. 6 there is provided a first movable element driven through a magnetic field by a first portion of the shaft, a second movable element driven through a magnetic field by a second portion of the shaft displaced longitudinally from the first portion, the respective motions of the movable elements having a phase difference determined by the torsional deflection of the shaft between these longitudinally spaced portions, and comparison means responsive to this phase difference adapted to produce a measurement dependent upon the said deflection.

Figure 7:
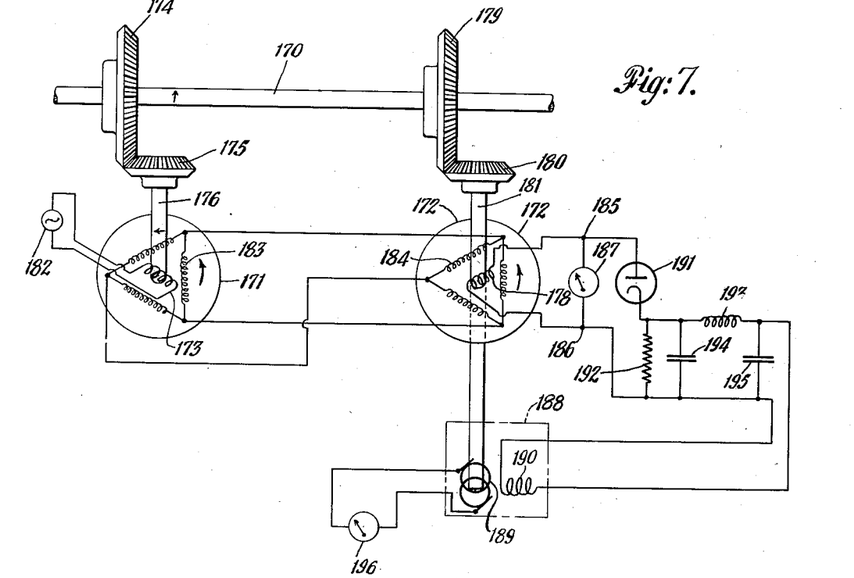
Fig. 7 is a schematic diagram of still another embodiment of apparatus adapted to measure the torque and the power transmitted by a rotating shaft, featuring the use of synchros having rotors driven by longitudinally separated portions of the shaft.

*Embodiment shown in Fig. 7*

Reference is made to Fig. 7 which illustrates a different embodiment of the invention. It may be assumed that it is desired to measure the torsional deflection of a rotating shaft 170. There are provided a plurality of control transformers of the synchro types 171 and 172 having rotors and stators. The rotor 173 of the synchro 171 is driven by a first portion of the shaft 170. This rotor may be mounted directly on the shaft or may be driven by suitable gears as illustrated.

Thus the shaft 170 may carry a gear 174 which drives a gear 175. The gear 175 may be mounted on a shaft 176, which in turn carries the rotor 173. The rotor 178 of the synchro 172 is similarly driven by a portion of the shaft 170 displaced longitudinally thereof from the portion which drives the rotor 173. Thus the shaft 170 may carry a gear 179 which drives a gear 180, which in turn drives a shaft 181 on which the rotor 178 is mounted. The ratios of the respective systems of gears should be the same, and may conveniently be arranged so that a small torsional deflection of the shaft produces a somewhat larger relative torsional deflection between the rotors.

The rotor 173 of the synchro 171 may comprise a single winding energized by a source 182 of alternating voltage. The stators of the synchros may comprise delta or Y-type windings, connected in parallel. The stator of the synchro 171 may be designated by the numeral 183 and that of the synchro 172 by the numeral 184.

It will be understood that as the energized winding 173 is rotated, it produces a rotating alternating magnetic field in its vicinity, thereby inducing currents in the stator 183 of the synchro 171. Since the two stators are connected in parallel, similar currents are caused to flow in the stator 184 of the synchro 172, and a similar rotating alternating magnetic field is produced in the synchro 172. The rotor 178 of the synchro 172 may comprise a single winding having output terminals 185 and 186. The system may initially be aligned so that when there is no torsional deflection of the shaft the rotor windings 173 and 178 are positioned in quadrature arrangement. That is, the rotating magnetic field produced in the region of the rotor 178 is oriented relative to this rotor so that substantially none of it links the winding 178, and hence zero voltage is induced in this winding. Thus the rotor 178 is rotated at the same speed as the magnetic field in the region thereof, but it is so positioned with respect to this field that there is, as stated, no voltage induced in the rotor 178.

When there is torsional deflection of the shaft, the position of the rotor 178 relative to the magnetic field in the region thereof will be changed so that there is a voltage induced in this rotor. As a result there appears across the terminals 185 and 186, an alternating voltage determined by the torsional deflection of the shaft and proportional thereto for small angles of deflection. A voltmeter 187 may be connected across these terminals and may be calibrated to indicate torque directly.

The rotor 173 may be viewed as a primary winding, and the stator 183 may be considered to comprise a secondary winding of the synchro 171 since the winding 173 induces currents in the winding 183. In the synchro 172, the stator 184 may be considered to comprise a primary winding, and the rotor 178 may be considered to comprise a secondary winding since the winding 178 is energized only as a result of currents flowing in the winding 184.

It may be observed that, in a sense, the rotation of the rotor 178 serves to counteract the voltage-producing effect of the rotation of the rotor 173 to a degree related to the torsional deflection of the shaft. That is, if the rotor 178 were not rotated, the rotation of the rotor 173 would produce a considerable voltage effect at the voltmeter 187, but rotation of the rotor 178 at the same speed as the magnetic field in the region thereof serves in a sense to counteract this voltage-producing effect. The counteraction is complete if there is no torsional deflection of the shaft in view of the original quadrature arrangement of the rotors, and is less complete if there is such a torsional deflection.

The system of Fig. 7 is adapted for indicating power as well as torque. In case it is desired to measure power, there may be provided a generator 188 having a rotor 189 and a stator or field winding 190. The rotor 189 is driven at a speed proportional to the speed of the shaft 170, and may for example be carried by the shaft 181. The winding 190 is in the present embodiment supplied with a direct current proportional to or dependent upon the torque of the shaft 170. For this purpose there is provided rectifying means, and the terminals 185 and 186 are connected through said rectifying means to the winding 190. Comprising the aforementioned rectifying means, there is provided a diode 191 and a resistor 192 connected in series across the terminals 185 and 186. The voltage appearing across the resistor 192 is filtered, as by a π-type filter comprising a series inductor 193 and shunt capacitors 194 and 195. The direct current from this filter which is applied to the winding 190, is approximately proportional to the torque transmitted by the shaft 170.

The winding 190 will induce in the region of the rotor 189 a unidirectional magnetic field determined by the torque transmitted by the shaft. The rotor 189 will be rotated at a speed determined by the speed of the shaft, and as a consequence there will be induced in the winding of the rotor 189 an alternating voltage determined by the product of the speed and the torque of the shaft, and hence determined by the power transmitted by the shaft. An alternating current voltmeter 196 calibrated to read power directly, may be connected across the winding of the rotor 189.

While the generator 188 in Fig. 7 has been shown as an alternator, it is possible to utilize a direct current generator and a direct current voltmeter, if desired.

As a variation, in case it is desired to secure a large output voltage, an amplidyne may be substituted in place of the generator 188.

In summary, it may be seen that there has been described an accurate and inexpensive apparatus and method for measuring the torque or the power transmitted by the rotating shaft. Thus there is provided, in combination, means comprising elements driven by longitudinally spaced portions of the shaft for producing energy variations dependent upon the torsional deflection between said shaft portions and measuring means controlled by said energy variations.

In certain embodiments there are provided means for producing a field of light, and in other embodiments there are provided means for producing a magnetic field. There are provided field-interrupting means, and means driven by longitudinally spaced portions of the shaft for causing relative motion between said field-interrupting means and the field itself, and for thereby causing modulation effects dependent upon the torsional deflection of the shaft. The modulation effects in turn may be employed to produce an indication of the torque. In case it is desired to measure power, the modulation effects may be employed to produce an electrical response proportional to torque, and this response, together with a response proportional to the speed of the shaft, may be applied to a multiplying device adapted to produce an indication of the power transmitted by the shaft.

While a suitable form of apparatus and mode of procedure to be used in accordance with the invention have been described in some detail, and certain modifications have been suggested, it will be understood that numerous changes may be made without departing from the general principles and scope of the invention.

What is claimed is:

1. In apparatus for measuring the torsional deflection of a rotating shaft, first and second separate light modulators, said first modulator including a first movable member, said second light modulator including a second movable member, said members being respectively driven by two longitudinally spaced portions of said shaft, each of said members comprising alternate light-reflecting and light-absorbing surface areas, a light beam directed toward each of said members, a first phototube for said first light modulator, a second phototube for said second light modulator, said light modulators being adapted to transmit to said phototubes modulated light beams differing in phase by an amount determined by the relative torsional deflection between said spaced portions of said shaft, said members being oriented with relation to one another in such manner that when there is no torsional deflection said first and second phototubes are simultaneously illuminated and simultaneously darkened, and when there is torsional deflection said first phototube is illuminated before said second phototube, a phase-sensitive comparison circuit connected to said first and second phototubes for producing a series of unidirectional current pulses each having a duration determined by the torsional deflection of said shaft, said circuit comprising first and second thyratrons respectively fired by said first and second phototubes, said first thyratron comprising an anode and a cathode, said second thyratron comprising an anode, a source of anode current supply, a terminal connected to said anode current supply, each of said anodes connected to said terminal, means for interrupting said anode current supply at intervals corresponding to the number of light-reflecting surface areas on said first movable member, said means comprising third and fourth phototubes positioned in a plane perpendicular to the axis of said first movable member, said phototubes being located at different angular positions with respect to the axis of said member, a light beam located in a plane passing through the axis of said member in such manner as to bisect the angle subtended at said axis by said third and fourth phototubes, said light beam being reflected by a light-reflecting surface area of said member toward said third phototube and then toward said fourth phototube in accordance with the angular position of said rotating shaft, a third thyratron connected to said third phototube and adapted to be fired thereby prior to the firing of said first and second thyratrons, said third thyratron being connected to said anode current supply source and to said anode current supply terminal and being adapted while conducting to supply a potential to said anode current supply terminal sufficient to support the conduction of said first and second thyratrons, a fourth thyratron connected to said fourth phototube and adapted to be fired thereby subsequent to the firing of said first and second thyratrons, said fourth thyratron being connected to said third thyratron and adapted on being fired to extinguish the conduction of said third thyratron, circuit means connected between said anode current supply terminal and the anodes of said first and second thyratrons for lowering the anode potential of said first thyratron below the value required to support conduction of said first thyratron on firing said second thyratron and thereby producing through said first thyratron said series of unidirectional current pulses, circuit means connected to the cathode of said first thyratron for providing a steady unidirectional voltage having a value determined by the duration of said unidirectional current pulses and hence by the torque transmitted by said shaft.

2. Apparatus in accordance with claim 1 including a generator driven by said shaft and adapted to produce a voltage proportional to the speed of rotation of said shaft, a multiplying device responsive to the voltage produced by said generator and to said unidirectional voltage determined by the torque transmitted by said shaft and adapted to produce an electrical response proportional to the product of said voltages, and an indicating instrument responsive to said multiplying device adapted to indicate the power transmitted by said shaft.

WILLIAM H. T. HOLDEN.

REFERENCES CITED

The following references are of record in the file of this patent:

UNITED STATES PATENTS

| Number | Name | Date |
|---|---|---|
| 1,685,964 | Smith et al. | Oct. 2, 1928 |
| 1,721,375 | Koning | July 16, 1929 |
| 2,077,220 | Smith | July 9, 1935 |
| 2,050,866 | Tamm | Aug. 11, 1936 |
| 2,136,223 | Thomas | Nov. 8, 1938 |
| 2,176,935 | Smith | Oct. 24, 1939 |
| 2,313,923 | Chubb | Mar. 16, 1943 |
| 2,346,976 | Langer et al. | Apr. 13, 1944 |
| 2,402,719 | Allison | June 25, 1946 |